US 8,312,616 B2

(12) United States Patent
Dole et al.

(10) Patent No.: US 8,312,616 B2
(45) Date of Patent: Nov. 20, 2012

(54) METHOD OF USING A PIPE COUPLING HAVING MOVABLE GRIPPING BODIES

(75) Inventors: Douglas R. Dole, Whitehouse Station, NJ (US); Michael V. Porter, Easton, PA (US); Torrey G. Sipos, Catasauqua, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 13/011,199

(22) Filed: Jan. 21, 2011

(65) Prior Publication Data
US 2011/0115216 A1 May 19, 2011

Related U.S. Application Data

(63) Continuation of application No. 12/119,661, filed on May 13, 2008, now Pat. No. 7,950,701.

(60) Provisional application No. 60/938,003, filed on May 15, 2007.

(51) Int. Cl.
B23P 11/00 (2006.01)
B21D 39/04 (2006.01)
F16L 23/00 (2006.01)

(52) U.S. Cl. ............... 29/525.02; 29/525.01; 29/525.11; 29/282; 285/367

(58) Field of Classification Search ............ 29/890.149, 29/525.01, 525.02, 525.11, 890.15, 282; 285/252, 253, 364–368, 411, 412, 413, 419, 285/420
See application file for complete search history.

(56) References Cited

U.S. PATENT DOCUMENTS

| 591,796 | A |   | 10/1897 | De Wolf |   |
|---|---|---|---|---|---|
| 711,946 | A |   | 10/1902 | Day |   |
| 1,004,634 | A |   | 10/1911 | Dixon |   |
| 1,532,596 | A |   | 4/1925 | Madsen |   |
| 1,662,954 | A |   | 3/1928 | Broido |   |
| 1,791,810 | A | * | 2/1931 | Furman | 285/286.2 |
| 1,821,863 | A | * | 9/1931 | Wilson | 285/334.2 |
| 1,930,194 | A |   | 10/1933 | Dillon |   |
| 2,028,182 | A |   | 1/1936 | Barnickol, Jr. |   |
| 2,473,046 | A |   | 6/1949 | Adams, Jr. |   |
| 2,512,741 | A |   | 6/1950 | Goodall |   |

(Continued)

FOREIGN PATENT DOCUMENTS
TW     I250054     3/2006

OTHER PUBLICATIONS

Dauvergne, Bertrand; Supplemental European Search Report; European Patent Application No. 08 75 5442; Mar. 26, 2010; 1 page.

(Continued)

*Primary Examiner* — Sarang Afzali
(74) *Attorney, Agent, or Firm* — Ballard Spahr LLP

(57) ABSTRACT

A method of joining pipe elements in end to end relation includes using a coupling having two or more segments connected to one another end to end surrounding a central space. The coupling also has at least one gripping body positioned between two of the segments. The pipe elements are inserted into the central space. The segments and the gripping body or bodies are moved toward the central space. The segments have arcuate surfaces which engage the outer surface of the pipe element. The gripping body or bodies have gripping surfaces which engage the outer surface of the pipe elements.

23 Claims, 14 Drawing Sheets

U.S. PATENT DOCUMENTS

| | | | |
|---|---|---|---|
| 3,003,793 | A | 10/1961 | Pitt |
| 3,078,108 | A | 2/1963 | Smith |
| 3,116,078 | A | 12/1963 | Scherer |
| 3,249,371 | A | 5/1966 | Peterman |
| 3,329,446 | A | 7/1967 | Katis et al. |
| 4,417,755 | A | 11/1983 | Gittleman |
| 4,438,954 | A | 3/1984 | Hattori |
| 4,611,835 | A | 9/1986 | Gittleman |
| 4,611,839 | A | 9/1986 | Rung et al. |
| 4,639,020 | A | 1/1987 | Rung et al. |
| 4,729,582 | A | 3/1988 | Zeidler |
| 5,037,141 | A | 8/1991 | Jardine |
| 5,058,931 | A | 10/1991 | Bowsher |
| 5,121,946 | A | 6/1992 | Jardine |
| 5,161,836 | A | 11/1992 | McKinnon |
| 5,188,401 | A | 2/1993 | Staniforth |
| 5,230,537 | A * | 7/1993 | Newman ................ 285/112 |
| 5,605,357 | A | 2/1997 | Bird |
| 5,722,701 | A | 3/1998 | Choi |
| 5,758,907 | A | 6/1998 | Dole et al. |
| 5,769,467 | A * | 6/1998 | Bridges ................ 285/370 |
| 5,772,253 | A | 6/1998 | Hodge et al. |
| 6,367,849 | B1 | 4/2002 | Tatsuta et al. |
| 6,499,771 | B1 | 12/2002 | Snyder, Sr. et al. |
| 7,086,131 | B2 | 8/2006 | Gibb et al. |
| 7,107,662 | B1 * | 9/2006 | Levario ................ 29/505 |
| 7,390,026 | B2 | 6/2008 | Noda |
| 7,401,819 | B2 | 7/2008 | Gibb et al. |
| 2005/0104369 | A1 | 5/2005 | Webb et al. |
| 2005/0258641 | A1 | 11/2005 | Gibb |

OTHER PUBLICATIONS

Young, Lee W.; PCT International Search Report; International Patent Application No. PCT/US08/63587; Sep. 15, 2008; 1 page.

Young, Lee W.; PCT Written Opinion of the International Searching Authority; International Patent Application No. PCT/US08/63587; Sep. 15, 2010, pp. 1-7.

Kee, Fannie C., Restriction Requirement from related U.S. Appl. No. 12/119,661; United States Patent and Trademark Office; pp. 1-5; Apr. 22, 2010.

Chionchio, John A., Response to Restriction Requirement from related U.S. Appl. No. 12/119,661; pp. 1-8; May 13, 2010.

Kee, Fannie C., Non-Final Office Action from related U.S. Appl. No. 12/119,661; United States Patent and Trademark Office; pp. 1-18; Aug. 3, 2010.

Chionchio, John A., Response to Non-Final Office Action from related U.S. Appl. No. 12/119,661; pp. 1-32; Nov. 2, 2010.

Kee, Fannie C., Non-Final Office Action from related U.S. Appl. No. 12/119,661; United States Patent and Trademark Office; pp. 1-10; Jan. 20, 2011.

Kee, Fannie C., Examiner Interview Summary from related U.S. Appl. No. 12/119,661; United States Patent and Trademark Office; pp. 1-4; Feb. 3, 2011.

Chionchio, John A., Response to Non-Final Office action from related U.S. Appl. No. 12/119,661; pp. 1-15; Feb. 4, 2011.

Kee, Fannie C., Notice of Allowance from related U.S. Appl. No. 12/119,661; United States Patent and Trademark Office; pp. 1-11; Apr. 18, 2011.

Stantella, Lena; Examiner's Report from related Canadian Patent Application No. 2,686,708; Canadian Intellectual Property Office; pp. 1-34; Apr. 11, 2011.

Author Unknown, Search Report for Patent Application; from corresponding Taiwan patent application No. 100104195; Sep. 7, 2011, pp. 1-4: Taiwan Patent Office.

Author Unknown, Translation of Search Report: from corresponding Taiwan patent application No. 100104195; Sep. 7, 2011; 1 page; Taiwan Patent Office.

* cited by examiner

METHOD OF USING A PIPE COUPLING HAVING MOVABLE GRIPPING BODIES

CROSS-REFERENCE TO RELATED APPLICATION

This application is a continuation application based upon and claiming priority to U.S. application Ser. No. 12/119,661, filed on May 13, 2008, now U.S. Pat. No. 7,950,701, which is based on and claims priority to U.S. Provisional Patent Application No. 60/938,003, filed May 15, 2007.

FIELD OF THE INVENTION

This invention relates to a method of using couplings having movable gripping bodies for joining pipe elements in end-to-end relationship.

BACKGROUND OF THE INVENTION

Mechanical couplings for joining pipe elements end-to-end find widespread use throughout a broad spectrum of industries such as the chemical industry, the petroleum industry and mining, as well as in municipal water service and fire suppression systems for buildings and other structures.

An example of a prior art coupling currently in use is provided in U.S. Pat. No. 7,086,131, which discloses a coupling having a pair of coupling segments joined end-to-end by fasteners received in lugs at each end of the segments. A sealing member is positioned between the segments. The coupling is pre-assembled at the factory. The segments are designed and sized to receive pipe elements in the field which are inserted directly between the coupling segments in the pre-assembled state, without the need to disassemble and reassemble the coupling. After insertion of the pipe elements, the fasteners are tightened to effect a fluid-tight, mechanically restrained joint between the pipe elements.

While it is advantageous to pre-assemble such couplings because it saves time and thereby cost during construction, power tools are often used to tighten the fasteners for convenience, as they are faster and less fatiguing. Power tools are of limited value, however, where no source of electrical power or compressed air is available, even those tools which are battery operated. Furthermore, power tools which cause electrical sparking may not be used in environments, such as mines, where explosive conditions may exist. It would be advantageous to provide a pipe coupling which can be pre-assembled (and thereby secure the cost advantages and convenience of such couplings) while being easily manually tightened by workmen installing the couplings. It is further advantageous to decrease the stiffness of the joint formed by the coupling for certain applications. This can be accomplished by employing couplings according to the invention.

SUMMARY OF THE INVENTION

An example embodiment of a method of joining pipe elements in end to end relation comprises:
 (a) using a coupling comprising a plurality of segments connected to one another end to end surrounding a central space, and at least one gripping body positioned between two of the segments;
 (b) inserting each of the pipe elements into the central space;
 (c) moving the segments toward the central space, the segments each having a plurality of arcuate surfaces engageable with the pipe elements and facing the central space;
 (d) engaging each one of the arcuate surfaces with an outer surface of one of the pipe elements;
 (e) moving the at least one gripping body toward the central space, the at least one gripping body having a plurality of gripping surfaces facing the central space; and
 (f) engaging each one of the gripping surfaces with an outer surface of one of the pipe elements.

The method may further comprise supporting the segments in spaced apart relation to one another on a seal positioned within the central space. The gripping body may also be supported on the seal. In an example method the segments may be connected to one another using adjustable fasteners and the segments may be moved toward the central space by tightening the fasteners.

In another example, the arcuate surfaces may be engaged within circumferential grooves in the pipe elements. Furthermore, the gripping surfaces may also be engaged within the circumferential grooves. For the pipe elements having circumferential grooves, the pipe elements are inserted so as to align the circumferential groove on each of the pipe elements with a respective one of the arcuate surfaces and a respective one of the gripping surfaces.

In an example method the gripping bodies may move in opposite directions. The segments may also move in opposite directions.

In another example of a method of joining pipe elements in end to end relation, the method comprises:
 (a) using a coupling comprising first and second segments connected to one another end to end surrounding a central space, and first and second gripping bodies positioned between the first and second segments;
 (b) inserting each of the pipe elements into the central space;
 (c) moving the first and second segments toward the central space, the first and second segments each having at least two arcuate surfaces engagable with the pipe elements and facing the central space;
 (d) engaging each one of the arcuate surfaces with an outer surface of one of the pipe elements;
 (e) moving the first and second gripping bodies toward the central space, the first and second gripping bodies each having at least two gripping surfaces facing the central space; and
 (f) engaging each one of the gripping surfaces with an outer surface of one of the pipe elements.

DETAILED DESCRIPTION OF THE EMBODIMENTS

Figure 1:
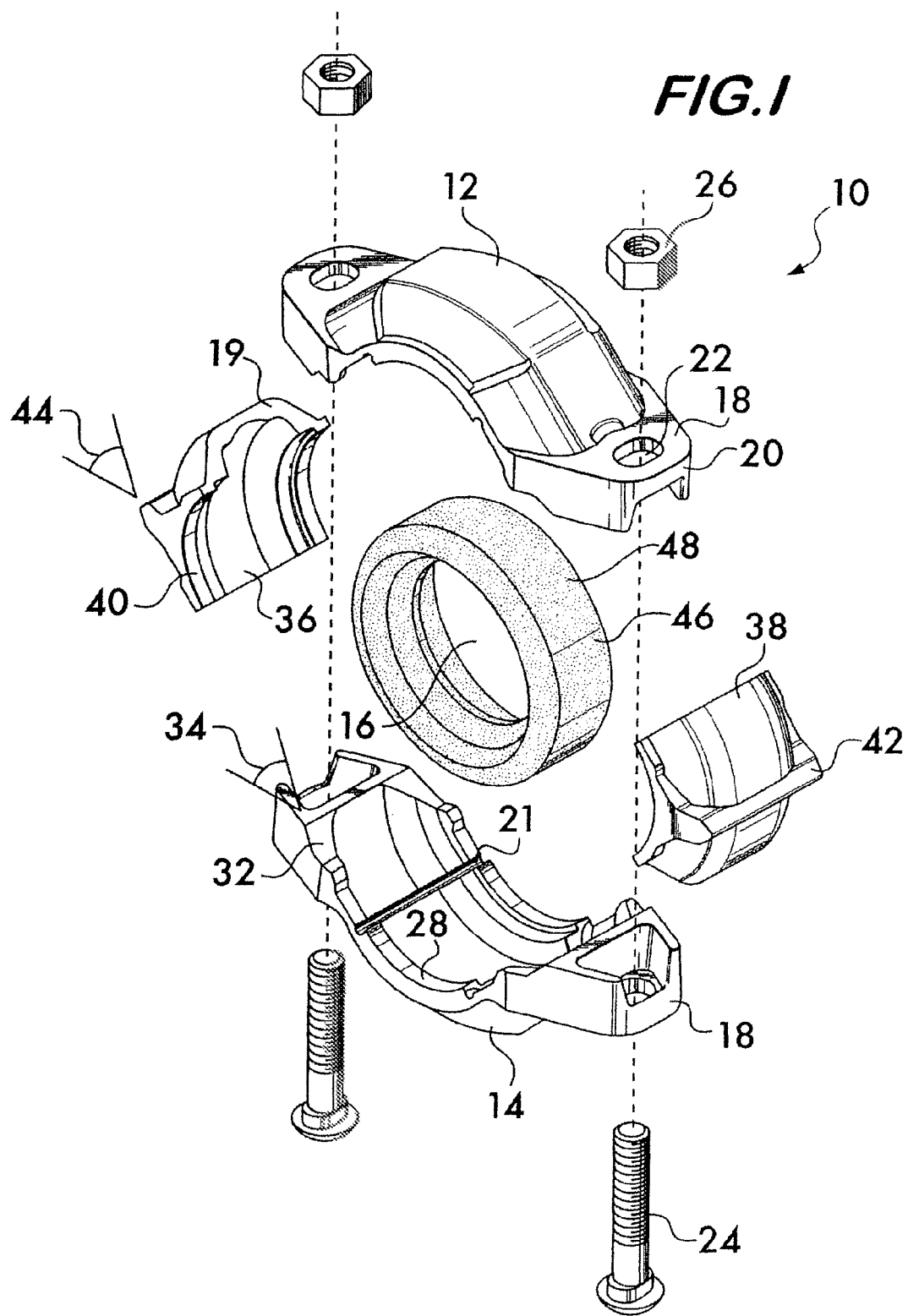
FIG. 1 is an exploded isometric view of an embodiment of a coupling according to the invention.

FIG. 1 shows an exploded isometric view of a coupling embodiment 10 according to the invention. Coupling 10 comprises a plurality of segments 12 and 14. Segments 12 and 14 are connectable end-to-end to surround a central space 16. Connection of the segments is effected by connection members 18 positioned at opposite ends of each of the segments 12 and 14. In this embodiment, the connection members comprise projections 20 which extend outwardly from the ends of the segments. Projections 20 have apertures 22 adapting them to receive fasteners, such as bolts 24 and nuts 26. The fasteners are adjustably tightenable and cooperate with the projections 20 for drawing the segments 12 and 14 toward the central space 16 upon tightening.

Figure 4:
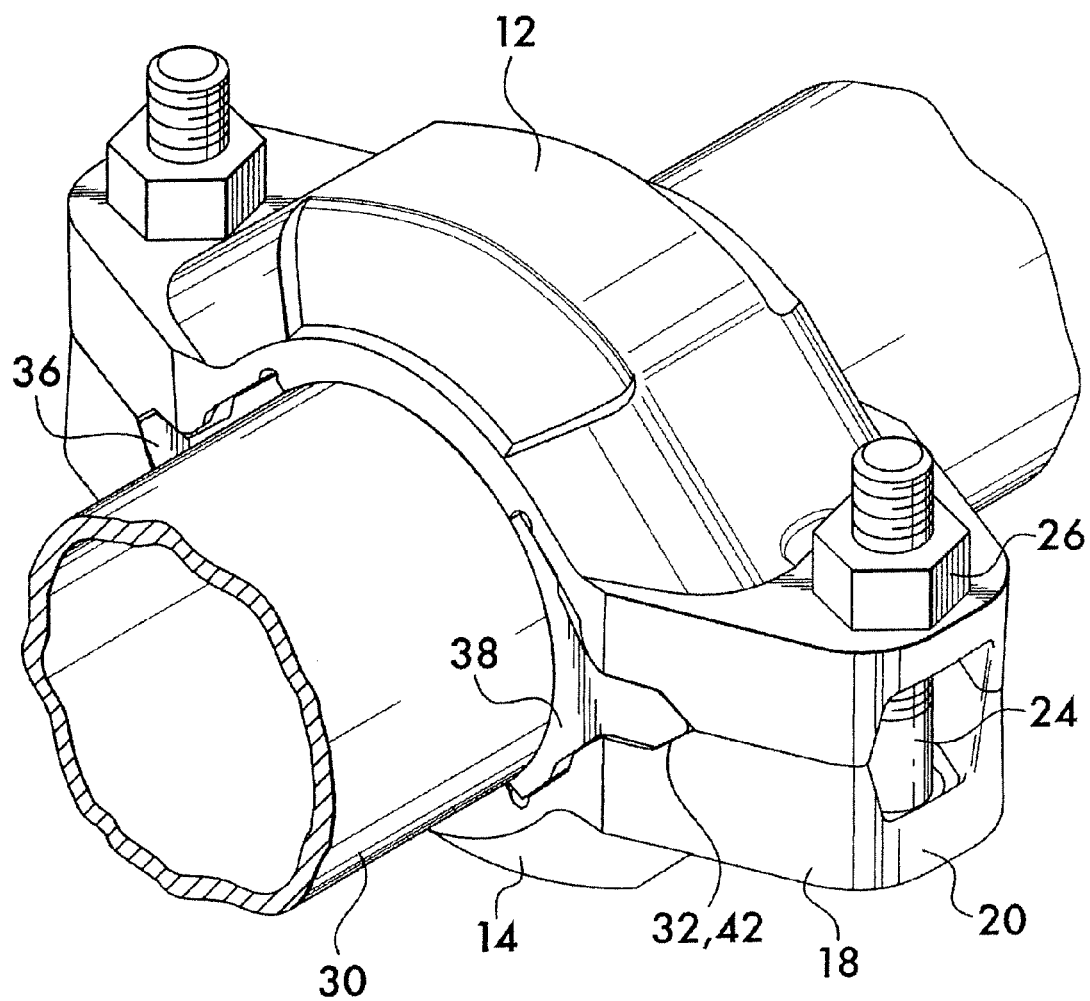
FIG. 4 is an isometric view of the coupling shown in FIG. 1.

Each segment has a pair of arcuate surfaces 28. Surfaces 28 are positioned in spaced relation to one another and face the central space 16. The arcuate surfaces engage and retain pipe elements 30 (see FIG. 4) when the fasteners connecting projections 20 are tightened to draw the segments toward each other. The arcuate surfaces may engage circumferential grooves in the pipe elements, plain ended pipe elements, flared end pipe elements or pipe ends having a shoulder.

Each segment also has at least one, but preferably a plurality of, reaction surfaces 32 positioned on the connection members 18. In the embodiment shown in FIG. 1, two reaction surfaces 32 are positioned on each projection 20. The reaction surfaces are angularly oriented with respect to the projections, and may have an orientation angle 34 from about 30° to about 60° and are inclined so as to face the central space 16. Orientation angles of about 45° are preferred as explained below.

Coupling 10 also comprises one or more gripping bodies. In the example embodiment, two gripping bodies 36 and 38 are positioned between the segments 12 and 14 opposite to one another. Each gripping body has a pair of gripping surfaces 40. Similar to the arcuate surfaces 28, the gripping surfaces are positioned in spaced apart relation and face the central space 16. Each gripping body has a pair of contact surfaces 42 positioned in facing relation with the reaction surfaces 32 on the projections 20 of the segments 12 and 14. The contact surfaces are also angularly oriented with respect to the projections, and may have an orientation angle 44 from about 30° to about 60°. Orientation angles of about 45° are preferred as explained below. Preferably, the orientation angles 34 and 44 are complementary to one another, meaning that they have approximately the same angular orientation.

Upon assembly of the coupling 10, a seal 46 is captured within the central space 16 by the segments 12 and 14 and the gripping bodies 36. Seal 46 ensures that the coupling 10 provides a fluid-tight joint between pipe ends. The seal 46 is sized so that, in an undeformed state, its outer circumference 48 supports the segments 12 and 14 and the gripping bodies 36 and 38 in spaced apart relation sufficient for pipe elements to be inserted into the central space 16 without disassembling the coupling.

Figure 2:
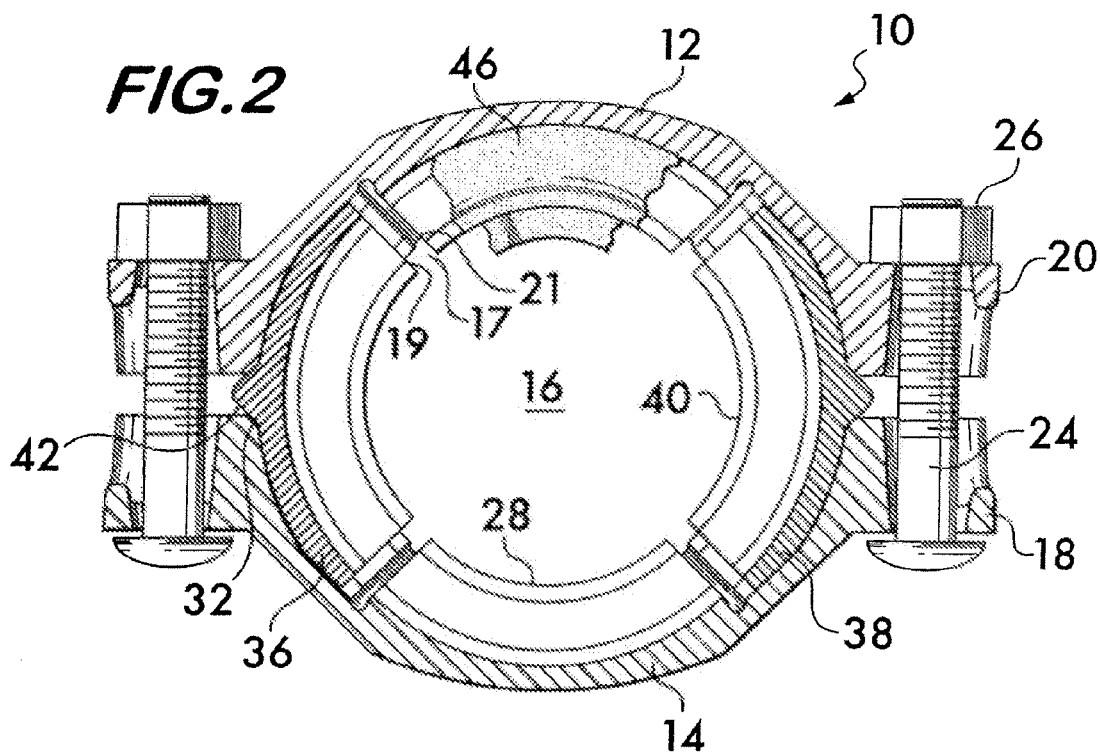
FIGS. 2 and 3 are cross-sectional views of the coupling shown in FIG. 1.
Figure 3:
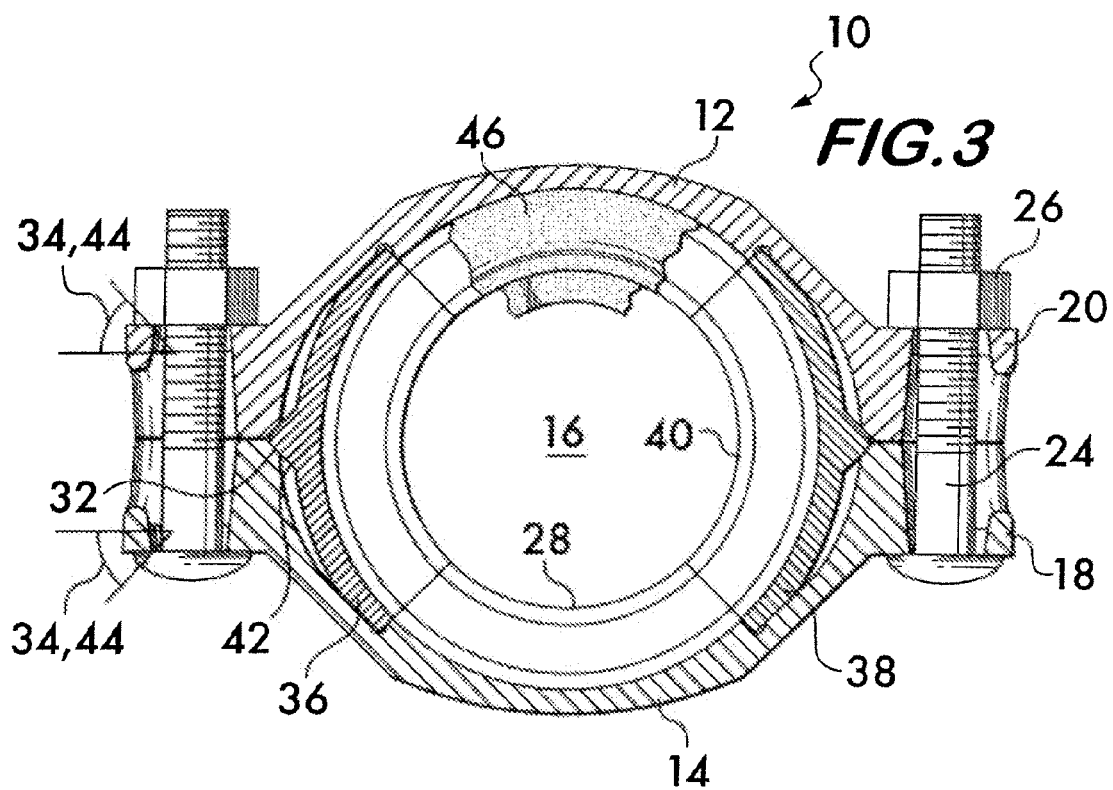

Operation of the coupling is described with reference to FIGS. 2 and 3. FIG. 2 shows the coupling 10 as received from the factory in the pre-assembled state, installation ready. In this configuration, the fasteners are not yet tightened, thereby allowing the segments 12 and 14 and the gripping bodies 36 and 38 to be positioned radially outwardly away from the central space 16 to allow pipe elements (not shown for clarity) to be inserted into the central space. As noted above, the seal 46 is sized to hold the segments and gripping bodies radially outwardly to facilitate pipe insertion. Upon insertion, the pipe elements engage the seal 46 which provides fluid tightness to the joint. Next, the bolts 24 and nuts 26 are tightened, drawing the segments 12 and 14 toward one another and the central space 16. As the segments move, the arcuate surfaces 28 are brought into engagement with the outer surface of the pipe elements to retain them in the coupling. As shown in FIG. 3, motion of the segments 12 and 14 toward one another causes the gripping bodies 36 and 38 to move inwardly toward the central space 16, in a direction substantially perpendicular to the motion of the segments. This permits the gripping surfaces 40 on the gripping bodies 36 and 38 to also engage the outer surface of the pipe elements. Motion of the gripping bodies toward the central space 16 is effected by the interaction of the contact surfaces 42 on the gripping bodies with the reaction surfaces 32 on the projections 20. The angular orientation 44 and 34 of the contact surfaces and the reaction surfaces respectively, allows the forces between the surfaces to be resolved into a component directed toward the central space. This force, applied at the contact surfaces, causes the motion of the gripping bodies toward the central space. As noted above, orientation angles of about 45° are preferred for both the reaction surfaces and the contact surfaces. The 45° angles ensure that, during the motion of the segments 12 and 14 and the gripping bodies 36 and 38 toward the central space 16, the arcuate surfaces 28 and the gripping surfaces 40 are at all times equidistant from the pipe elements 30 and contact the pipe elements substantially simultaneously.

As shown in FIG. 2, there are multiple gaps 17 between the end faces 19 of the gripping bodies 36, 38, and shoulders 21 on segments 12 and 14. The gaps 17 allow for the relative motion between the gripping bodes and the segments. The gaps are about one half the size of gaps between segments in prior art couplings and consequently the gripping bodies and segments have less tendency to pinch the seal 46 as the gaps 17 close to virtually line on line contact as shown in FIG. 3. This results in more uniform compression of seal 46 and the elimination of extrusion paths for the seal when under pressure.

It is advantageous to position the reaction surfaces 32 on the projections 20 and have the contact surfaces 42 project substantially radially outwardly away from the central space 16 so that the interface between the contact surfaces and the reaction surfaces is near the fastener (bolt 24, nut 26) which joins the connections members 18 (in this example projections 20) to one another. Internal pressure within the coupling 10, acting on the seal 46, will force the segments 12 and 14 and the gripping bodies 36 and 38 away from the central space. Force applied to the gripping bodies within the coupling is transmitted to the segments at the interface between the contact surfaces 42 and the reaction surfaces 32. Due to their angular orientation, the contact surfaces will tend to act like a wedge and force the projections 20 apart. By placing the interface close to the fastener joining the projections, the separation of the projections will be less than if the interface were farther from the fastener. The advantageous positioning of the contact surface-reaction surface interface minimizes the separation of the segments and allows the coupling to withstand higher pressures without leaking. Furthermore, by placing the reaction forces between the segments and the gripping bodies near the fasteners the distortion of the segments by the gripping bodies is lessened and the coupling better maintains its round shape.

Figure 4A:
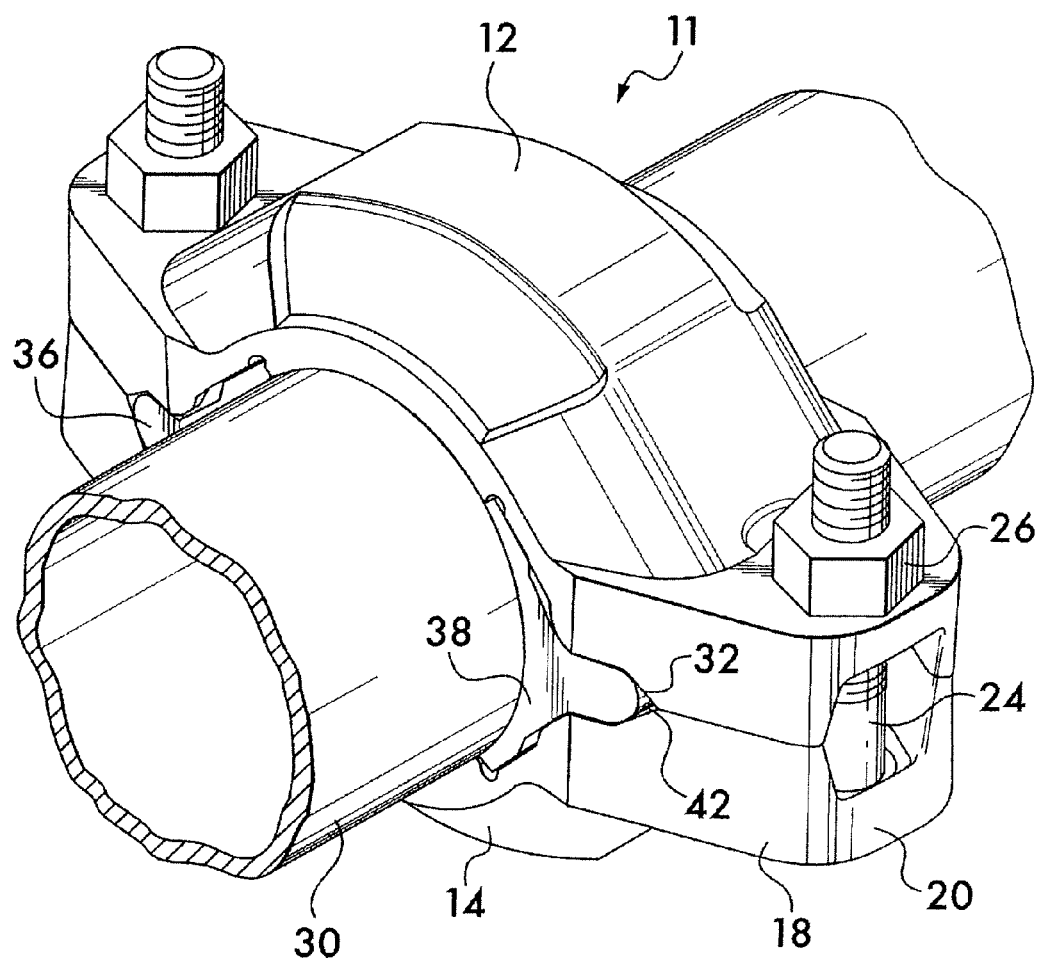
FIGS. 4A and 4B are isometric views of alternate embodiments of a coupling according to the invention.
Figure 4B:
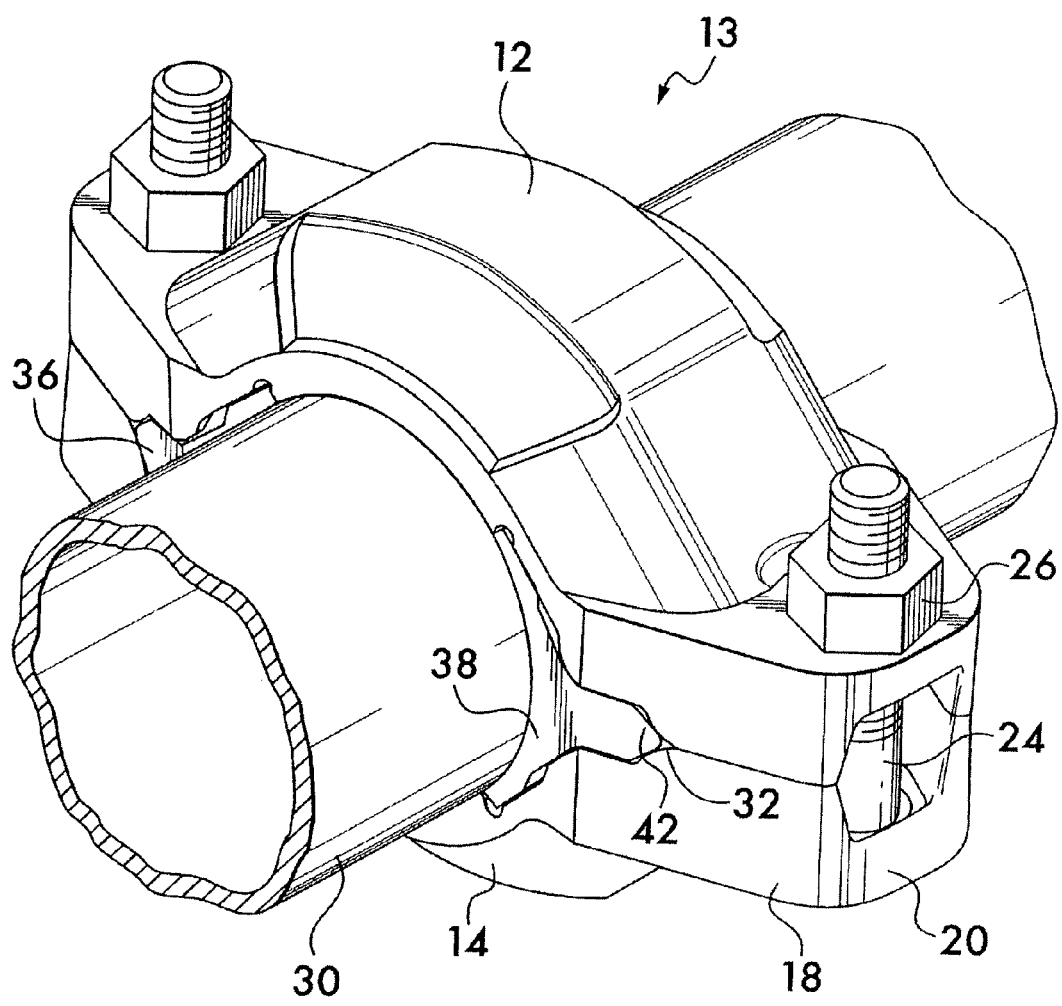

FIG. 4A illustrates another embodiment 11 of a coupling according to the invention. In this embodiment, the contact surfaces 42 on the gripping bodies 36 and 38 have a convex shape. This permits them to engage the reaction surfaces 32 tangentially when the segments 12 and 14 are drawn toward one another, resulting in reaction forces which cause motion of the gripping bodies toward the central space. The reaction surfaces 32 are angularly oriented. FIG. 4B shows another embodiment 13 wherein the reaction surfaces 32 have a convex shape and the contact surfaces 42 are angularly oriented. This again allows for tangential engagement between the reaction surfaces and the contact surfaces, resulting in reaction forces which cause motion of the gripping bodies toward the central space as the segments 12 and 14 are drawn toward each other.

Figure 5:
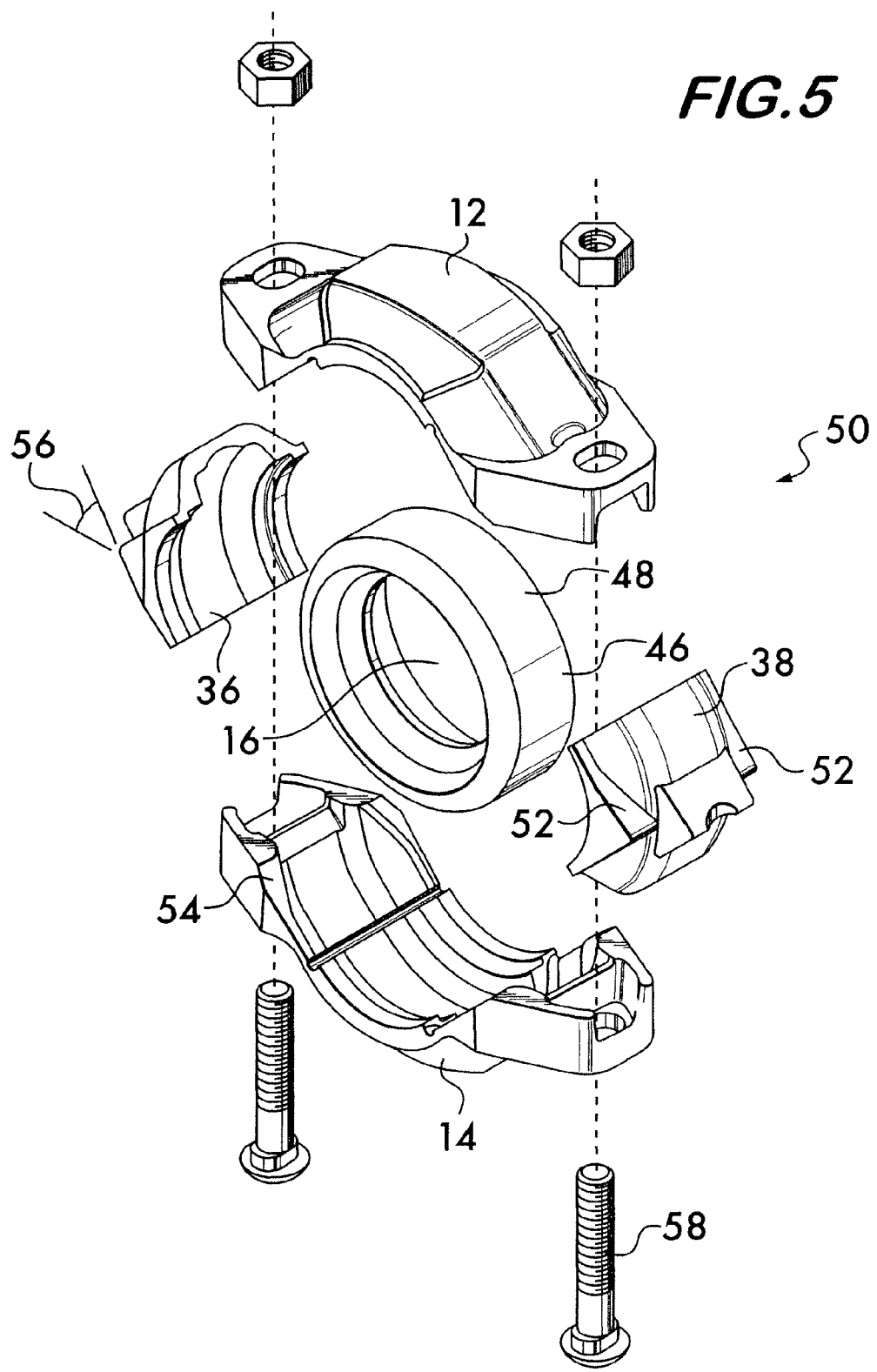
FIG. 5 is an exploded isometric view of another embodiment of a coupling according to the invention.
Figure 8:
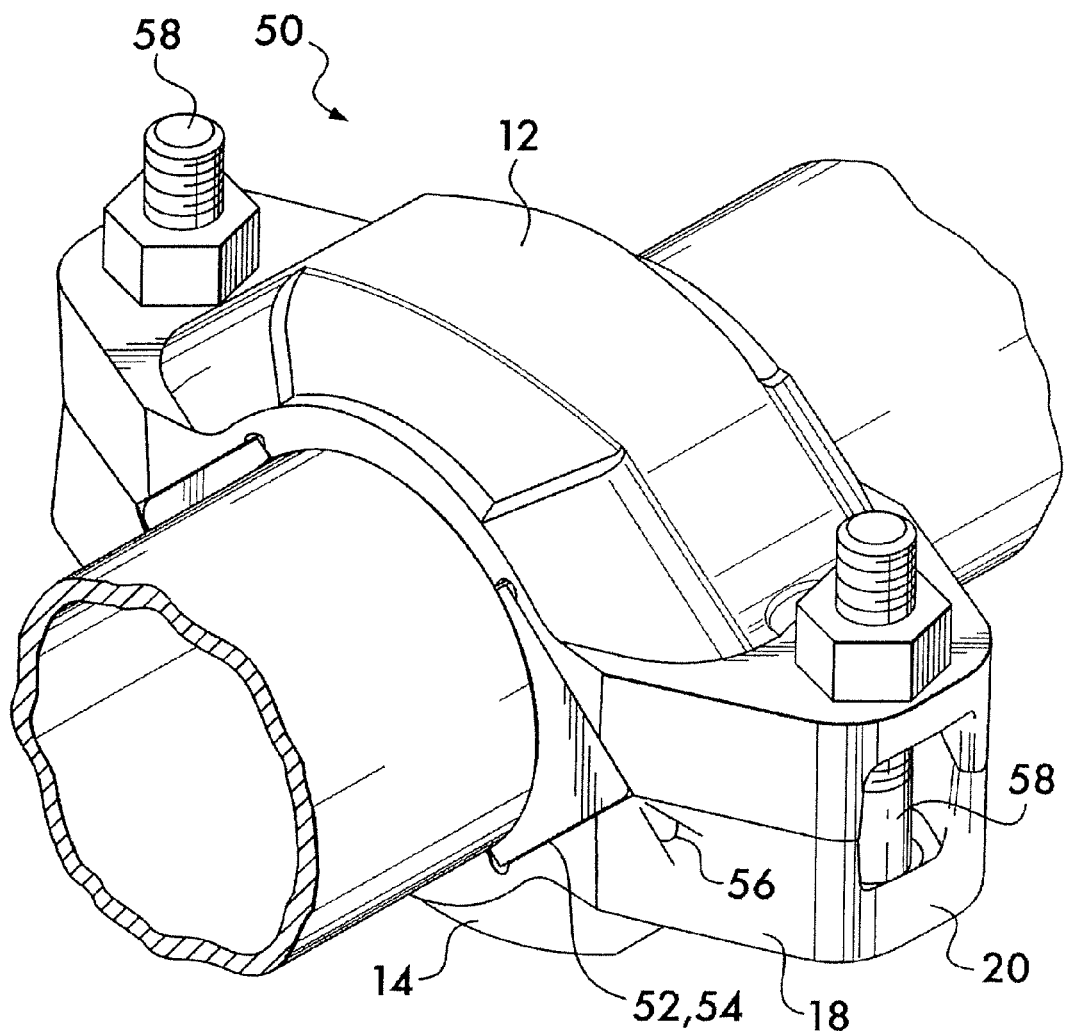
FIG. 8 is an isometric view of the coupling shown in FIG. 5.

FIG. 5 shows an isometric exploded view of another coupling embodiment 50 according to the invention. Coupling 50 has gripping bodies 36 and 38 with contact surfaces 52 positioned on opposite sides of the gripping bodies. Again, the contact surfaces are angularly oriented with respect to the connection members 18 and interface with reaction surfaces 54 positioned on the connection members 18. Orientation angles 56 for the contact surfaces from about 30° to about 60° are advantageous for this coupling design. It is preferred that the orientation angle of the reaction surfaces 54 be approximately the same as the contact surfaces as shown in FIG. 8.

Upon assembly of coupling 50, a seal 46 is captured within the central space 16 by the segments 12 and 14 and the gripping bodies 36 and 38. Seal 46 ensures that the coupling 50 provides a fluid tight joint between the pipe ends. The seal is sized so that, in an undeformed state, its outer circumference 48 supports the segments 12 and 14 and the gripping bodies 36 and 38 in spaced apart relation sufficient for pipe elements to be inserted into the coupling without disassembling the coupling.

Figure 6:
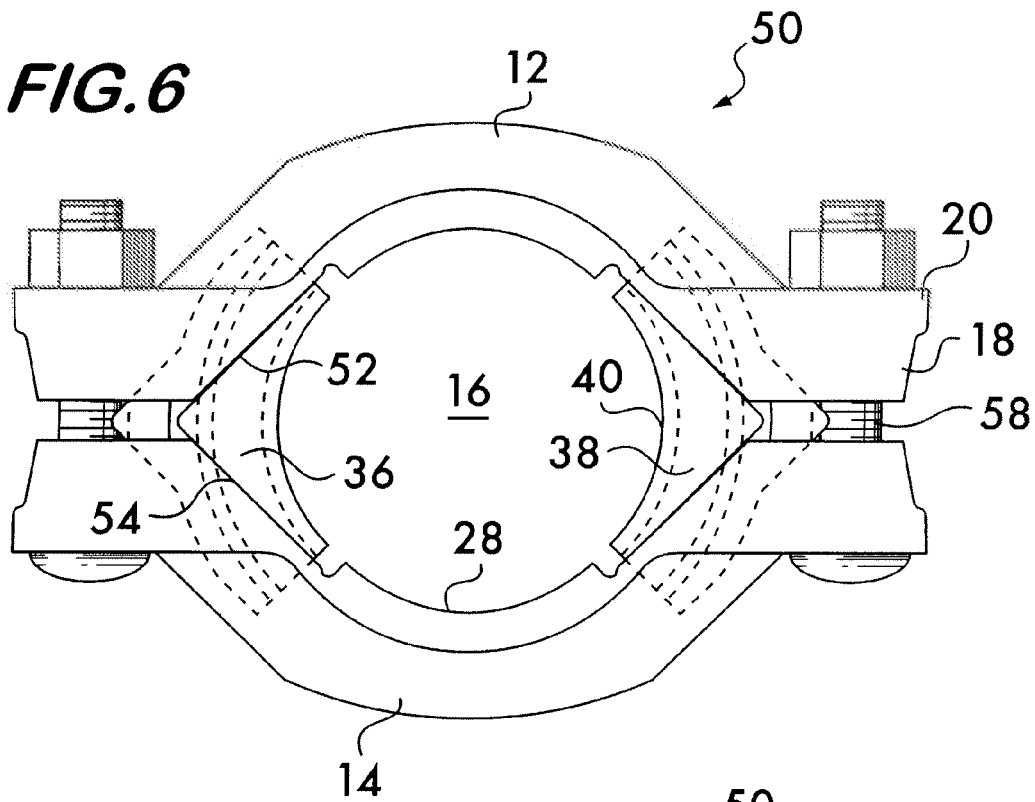
FIGS. 6 and 7 are elevational views of the coupling shown in FIG. 5.
Figure 7:
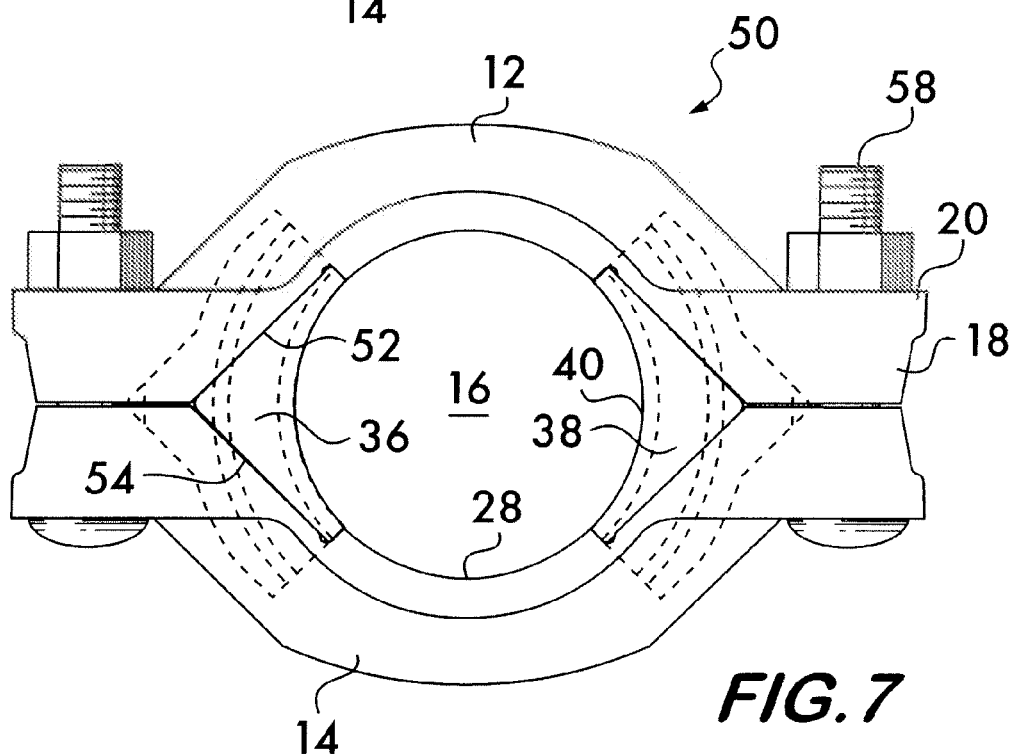

Operation of coupling 50 is similar to that of coupling 10 described above. As shown in FIG. 6, before tightening of fasteners 58 the segments 12 and 14 and the gripping bodies 36 and 38 are spaced outwardly away from the central space 16 so as to allow a pipe element to be inserted into the central space. Tightening of the fasteners as shown in FIG. 7 draws the segments 12 and 14 toward one another and the central space, allowing the arcuate surfaces 28 to engage the pipe elements' outer surface. Interaction between the contact surfaces 52 on the gripping bodies 36 and 38 and the reaction surfaces 54 on the segments 12 and 14 forces the gripping bodies to move inwardly toward the central space as the fasteners 58 are tightened. The inward motion of the gripping bodies allows their gripping surfaces 40 to engage the pipe elements 30 as shown in FIG. 8.

Figures 9, 10:
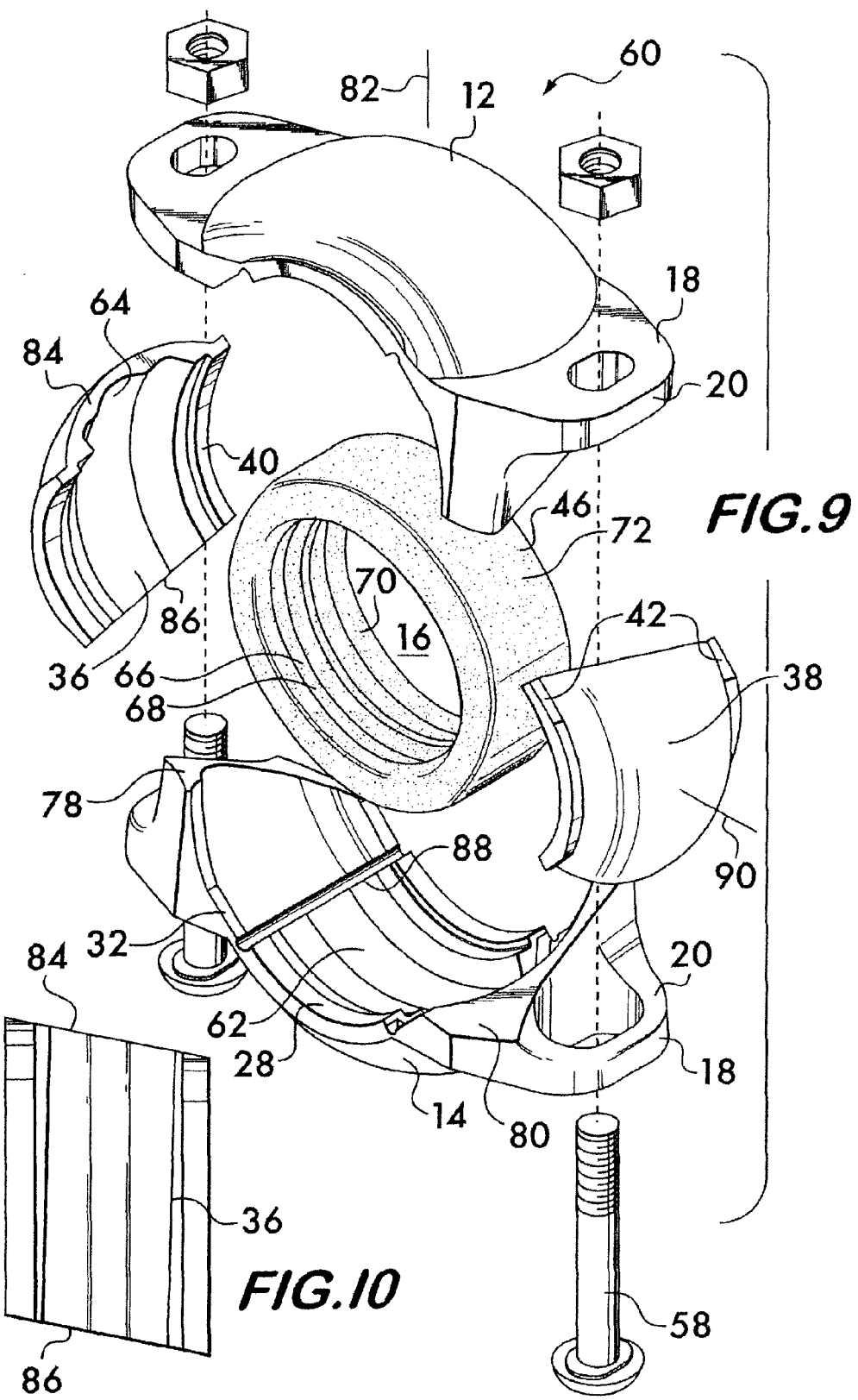
FIG. 9 is an isometric exploded view of another coupling embodiment according to the invention.
FIG. 10 is a front view of a component of the coupling shown in FIG. 9.

FIG. 9 shows an exploded view of another coupling embodiment 60 according to the invention. Coupling 60 comprises coupling segments 12 and 14. The segments are arranged in facing relation and are joined end-to-end by connection members 18 positioned at opposite ends of each segment. In this embodiment, as with those previously described, the connection members comprise outwardly extending projections 20 which receive fasteners 58 that are adjustably tightenable. Tightening of the fasteners draws the coupling segments 12 and 14 toward one another and the central space 16.

Each segment has inwardly facing arcuate surfaces 28 positioned in spaced relation to one another. The arcuate surfaces occupy positions between the ends of each segment. Reaction surfaces 32 are positioned in spaced relation at opposite ends of each coupling segment 12 and 14. The reaction surfaces face inwardly toward the central space 16 and extend in a tangential direction around the segments. The reaction surfaces are angularly oriented as described below.

Figure 11:
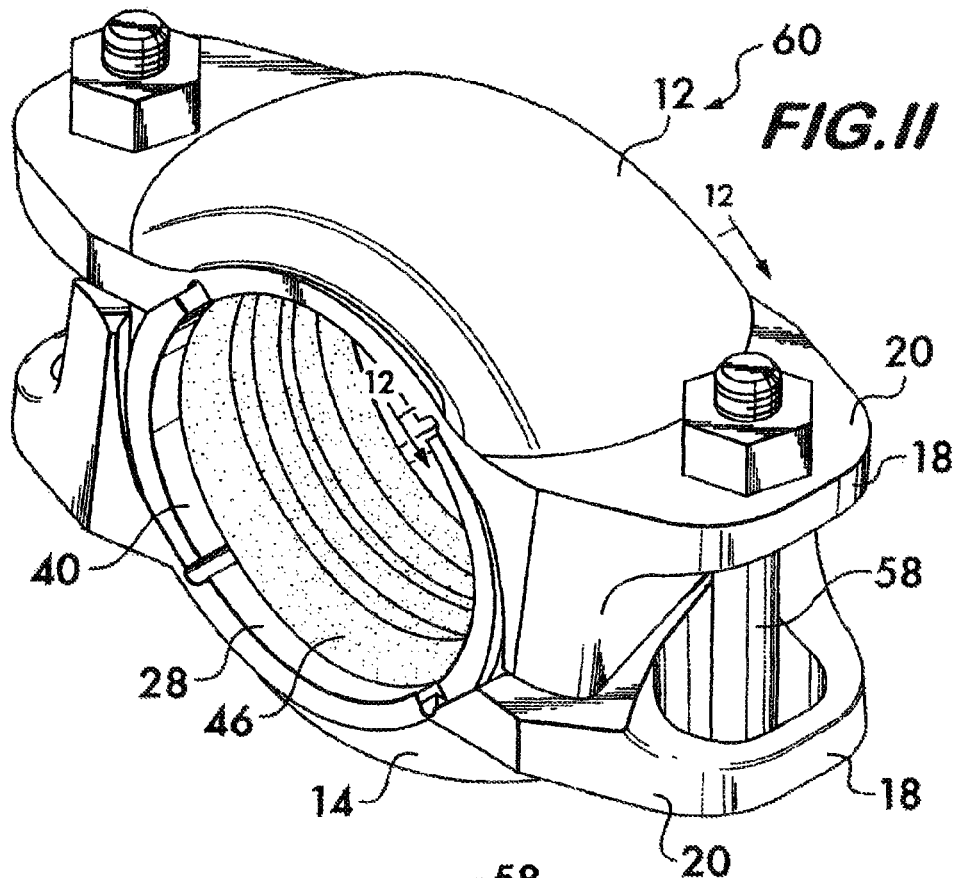
FIG. 11 is an isometric view of the coupling shown in FIG. 9.

Gripping bodies 36 and 38 are positioned between the segments 12 and 14 at opposite ends of the coupling 60. Each gripping body has inwardly facing gripping surfaces 40 arranged in spaced relation. Preferably, the gripping surfaces 40 align with respective arcuate surfaces 28 when the coupling is assembled as best shown in FIG. 11. With reference again to FIG. 9, each gripping body has contact surfaces 42 in spaced relation. Contact surfaces 42 face outwardly away from the central space 16 and engage respective reaction surfaces 32 on the segments 12 and 14. The contact surfaces on the gripping bodies cooperate with the reaction surfaces on the segments such that, when the segments are drawn toward one another, for example, by the tightening of fasteners 58, the gripping bodies are urged radially inwardly as explained further below.

A seal 46 is positioned between the coupling segments 12 and 14 and the gripping bodies 36 and 38. Both the segments and gripping bodies have respective channels 62 and 64 positioned between the arcuate surfaces 28 and the gripping surfaces 40 which receive the seal. The inner circumference 66 of the seal 46 has inwardly facing sealing surfaces 68 and 70 which engage pipe elements joined by the coupling to form a fluid-tight seal. The seal 46 is sized so that, in an undeformed state, its outer circumferences 72 supports the segments 12 and 14 and the gripping bodies 36 and 38 in spaced apart relation sufficient for pipe elements to be inserted into the central space 16 without disassembling the coupling. Preferably, the sealing member is a ring formed of an elastic, resilient material such as EPDM elastomer which deforms when the coupling segments are drawn toward one another by adjustably tightening the connection members 18.

Figure 12:
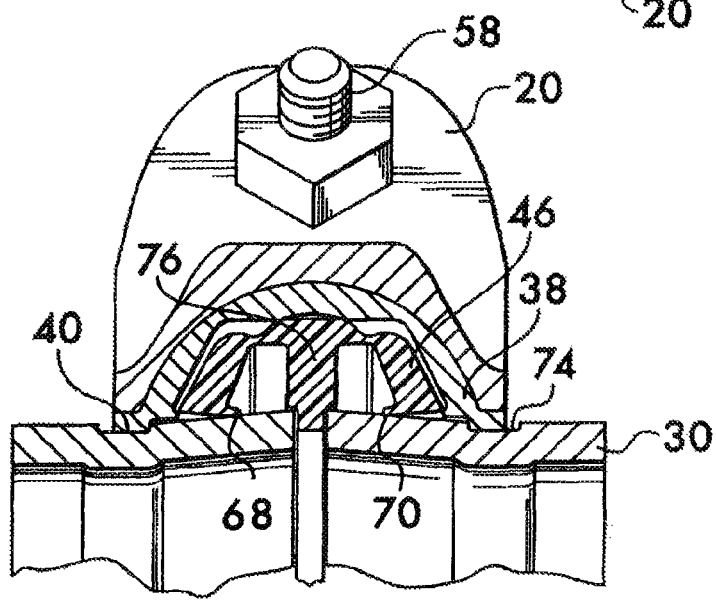
FIG. 12 is a sectional view taken at line 12-12 of FIG. 11.

FIG. 11 shows the pipe coupling 60 in its pre-assembled state ready for use. To effect a fluid-tight joint connecting pipe elements in end-to-end relation, pipe elements 30 are inserted into the sealing member 46 as shown in FIG. 12, so that the segments straddle facing end portions of the pipe elements. The pipe elements are inserted to an extent such that grooves 74 in the outer surfaces of the pipe elements align with the arcuate surfaces of the segments (not shown) and the gripping surfaces 40 of the gripping bodies 36 and 38. Insertion of the pipe elements to the proper depth may be facilitated by a pipe stop 76 positioned on the sealing member between the sealing surfaces 68 and 70. The pipe stop projects inwardly to engage the ends of the pipe elements and limit the insertion depth as desired.

Figure 13:
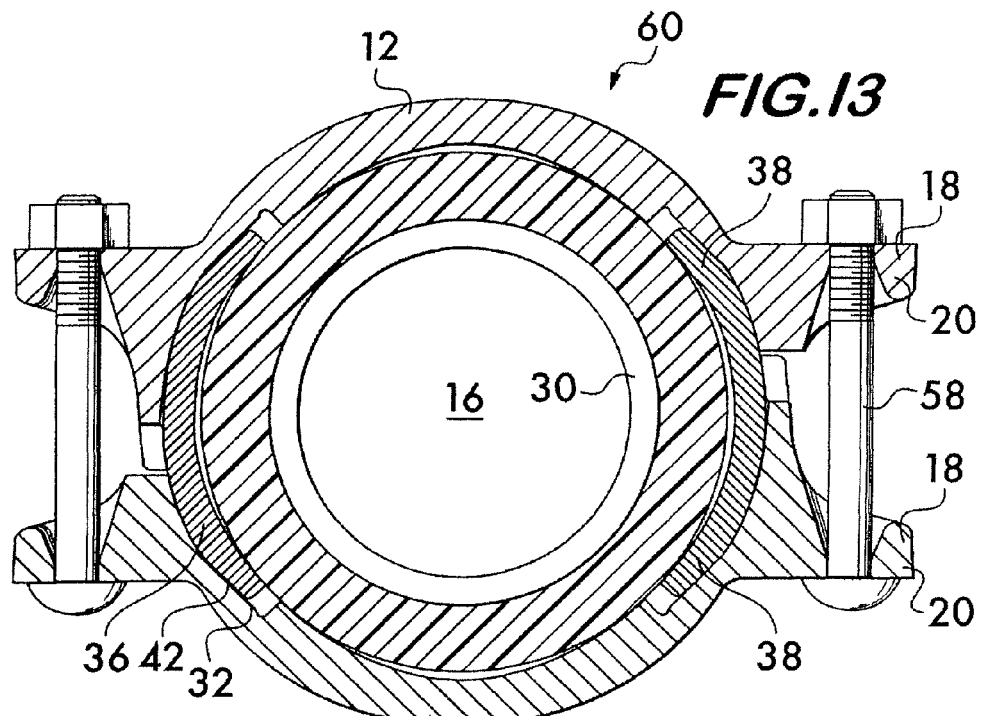
FIGS. 13 and 14 are sectional views of the coupling shown in FIG. 9.
Figure 14:
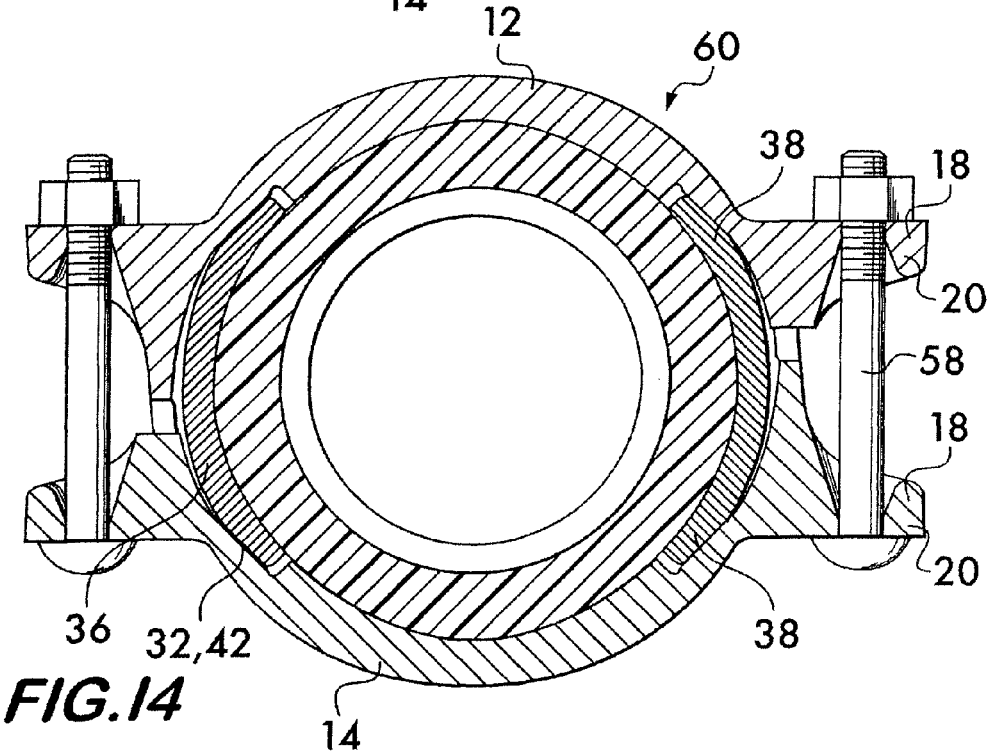

FIG. 13 shows a cross-sectional view of the coupling 60 with pipe element 30 inserted. Attention is drawn to the reaction surfaces 32 on segments 12 and 14 engaging the contact surfaces 42 on gripping bodies 36 and 38. The reaction surfaces are angularly oriented so that when the fasteners 58 are tightened, drawing the segments 12 and 14 toward one another as shown in FIG. 14, the gripping bodies 36 and 38 are moved radially inwardly so that the gripping surfaces on the gripping bodies engage and grip the grooves 74 of the pipe elements 30 shown in FIG. 12. The motion of the segments 12 and 14 toward one another also causes the arcuate surfaces 28

(not shown) on each segment to engage and grip the grooves as well. The pipe elements are, thus, secured in end-to-end relation. The sealing member is deformed radially inwardly to force the sealing surfaces 68 and 70 into further engagement with the outer surfaces of the pipe elements. This configuration produces a relatively rigid joint. A more flexible joint can alternately be provided if the motion of the arcuate surfaces is limited so that they do not engage and clamp the floor of the groove. To this end, the travel of the gripping bodies is limited by the extent or length of the reaction surfaces and the contact surfaces. Limitation of motion of the arcuate surfaces on the segments toward the central space is preferably controlled by limiting the motion of the segments through contact of the connection members 18.

As noted, the coupling embodiment 60 provides a substantially rigid joint for the pipe elements, i.e., the joint has significant stiffness about all three axes (bending, axial extension and torsion) to prevent significant angular deflection as well as axial movement (compression and extension) of the pipe elements relatively to one another. Torsional deflections are also inhibited. The rigidity of the joint is effected by the angularly oriented surfaces 78 and 80 positioned on each segment 12 and 14 adjacent to the connection members 18 as best shown in FIG. 9. The surfaces 78 and 80 on each segment have opposite slopes and are in facing relation with the angularly oriented surfaces on the adjoining segment. When the segments 12 and 14 are drawn toward one another by tightening of fasteners 58, the angularly oriented surfaces on each segment engage one another and force the segments to rotate in opposite directions about an axis 82, perpendicular to the pipe elements joined by the coupling. The rotation of the segments causes the arcuate surfaces 28 to forcibly engage the sidewalls of the grooves in the pipe elements and stiffen the joint, as described in U.S. Pat. Nos. 4,611,839, 4,639,020 and 5,758,907 hereby incorporated by reference.

To further enhance the rigidity of the joint between pipe elements formed by coupling 60, the gripping bodies 36 and 38 may be designed as shown in FIG. 9 such that their end faces 84 and 86 are angularly oriented relative to the gripping surfaces 40. The angular orientation is best shown in FIG. 10 for gripping body 36 which takes on a rhomboidal profile as a result. The end faces 84 and 86 engage inwardly projecting shoulders 88 on each segment 12 and 14 as the segments are drawn toward one another when forming a joint. The angular orientation of the end faces causes the gripping bodies 36 and 38 to rotate in opposite directions about an axis 90 as they are brought into contact with the shoulders 88. Axis 90 is substantially perpendicular to the pipe elements being joined by the coupling segments 12 and 14. The rotation of the gripping bodies causes the gripping surfaces 40 thereon to rotate and forcibly engage the sidewalls of the grooves in the pipe elements similar to the arcuate surfaces on the segments. To avoid rotationally deforming the seal 46, the channels 64 in each gripping body are skewed in the opposite direction of rotation so that, when the gripping elements rotate about axis 90, the channels 64 will align with the sealing members so that essentially only radial compression results, i.e., there is no significant twisting of the sealing member about axis 90.

It is further observed that the angular orientation of the end faces 84 and 86 causes rotation of the segments 12 and 14 about axis 82, thereby rendering the sloped surfaces 78 and 80 optional, and useful to enhance the rotation of the segments if necessary.

Figure 15:
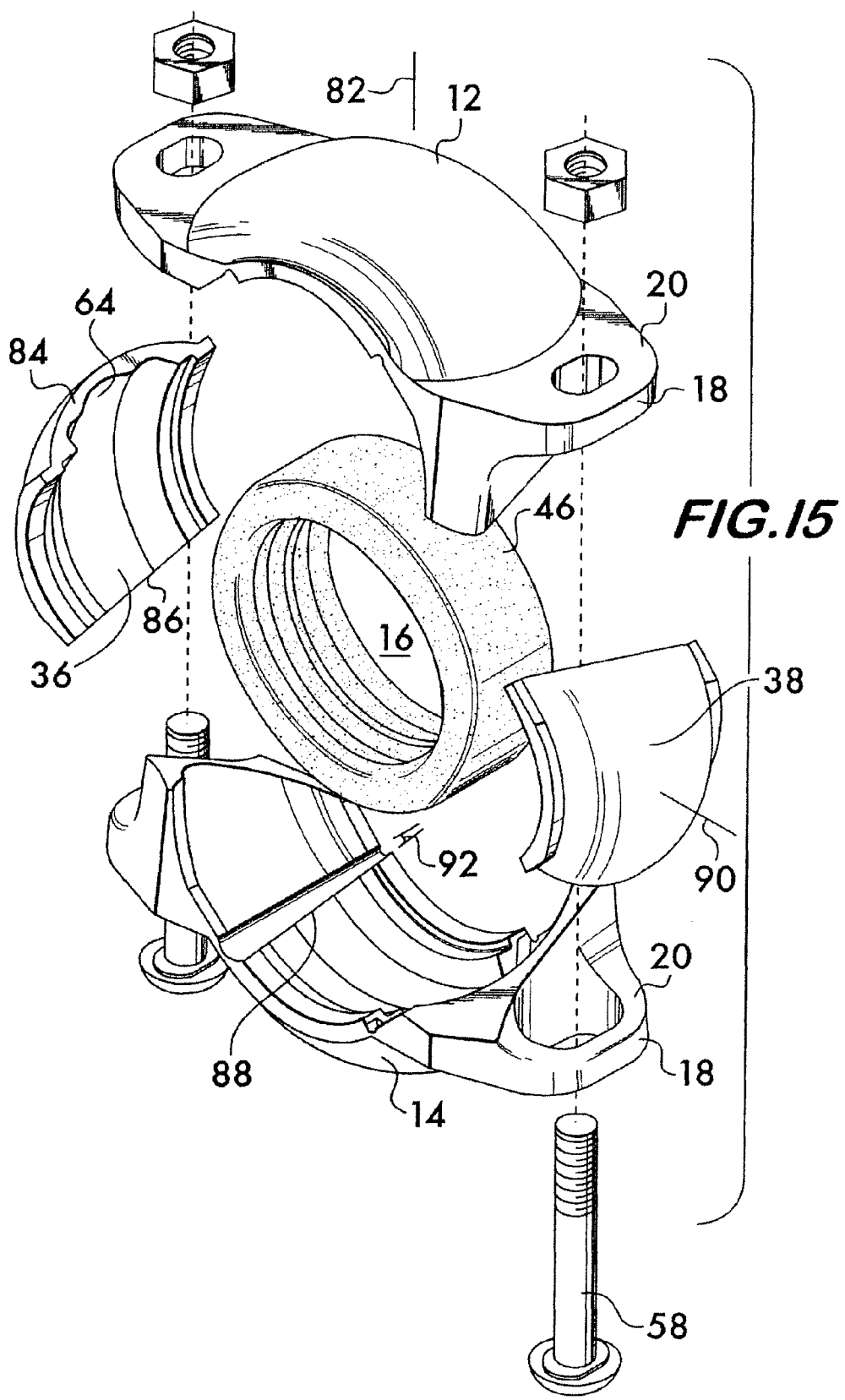
FIG. 15 is an exploded view of another embodiment of the coupling according to the invention.

Rotation of the gripping bodies 36 and 38 about axis 90 may also be achieved by angularly orienting the inwardly projecting shoulders 88 as shown in FIG. 15, the orientation angle 92 of the shoulder forcing rotation of the gripping bodies as the segments 12 and 14 are drawn together, forcing engagement between the shoulders 88 and the end faces 84 and 86 of the gripping bodies. It is also possible to combine the features of FIGS. 9 and 15 and have both the end faces 84 and 86 angularly oriented as well as the shoulders 88.

It is also feasible to provide angularly oriented surfaces on each segment which have opposite slopes. Such couplings will also provide a rigid joint, but the interaction of the surfaces causes the couplings to slide in opposite directions and thereby engage the sidewalls of the grooves. If it is desired to allow some degree of bending flexibility to the joint, the surfaces adjacent to the connection members are made with no slope, i.e., substantially flat.

Figure 16:
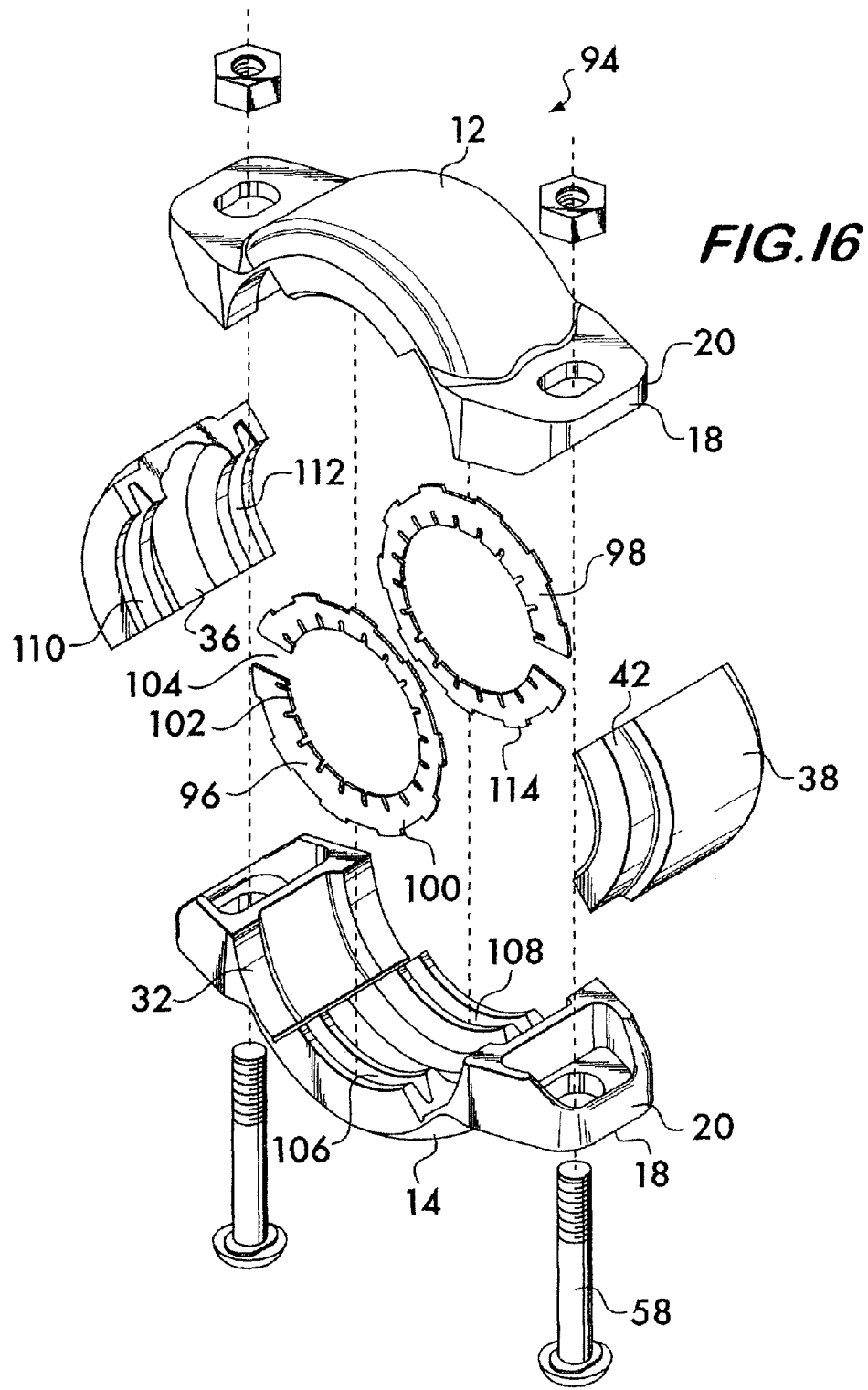
FIG. 16 is an exploded view of another embodiment of the coupling according to the invention.

FIG. 16 shows an exploded view of another coupling embodiment 94 according to the invention. Coupling 94 is used to couple plain end pipe elements together, i.e., pipes having no grooves, beads, enlargements or other features near the ends to facilitate engagement with the coupling. Many of the components of this embodiment are similar to coupling 60 and will not be described in detail. Note also that the sealing member 46 shown in FIG. 1 is not shown in FIG. 6 for clarity, although the same or a similar sealing member is also used with coupling 94.

To enable the coupling 94 to grip plain end pipe elements, two retainers 96 and 98 are used. Each retainer comprises an annular band 100 which has a plurality of flexible, resilient teeth 102. The teeth project radially inwardly for engagement with the pipe elements as described below. The teeth are also angularly oriented out of the plane of the band 100, with the teeth on retainer 96 being angled toward the teeth on retainer 98 and vice versa. The angular orientation of the teeth allows the pipe elements to be inserted into the coupling, but prevents the pipe elements from being withdrawn when the teeth forcibly engage the pipe elements as described below. Band 100 is split, as evidenced by the gap 104. This gap permits the band to be compressed radially to allow the teeth to engage the pipe elements.

Figure 17:
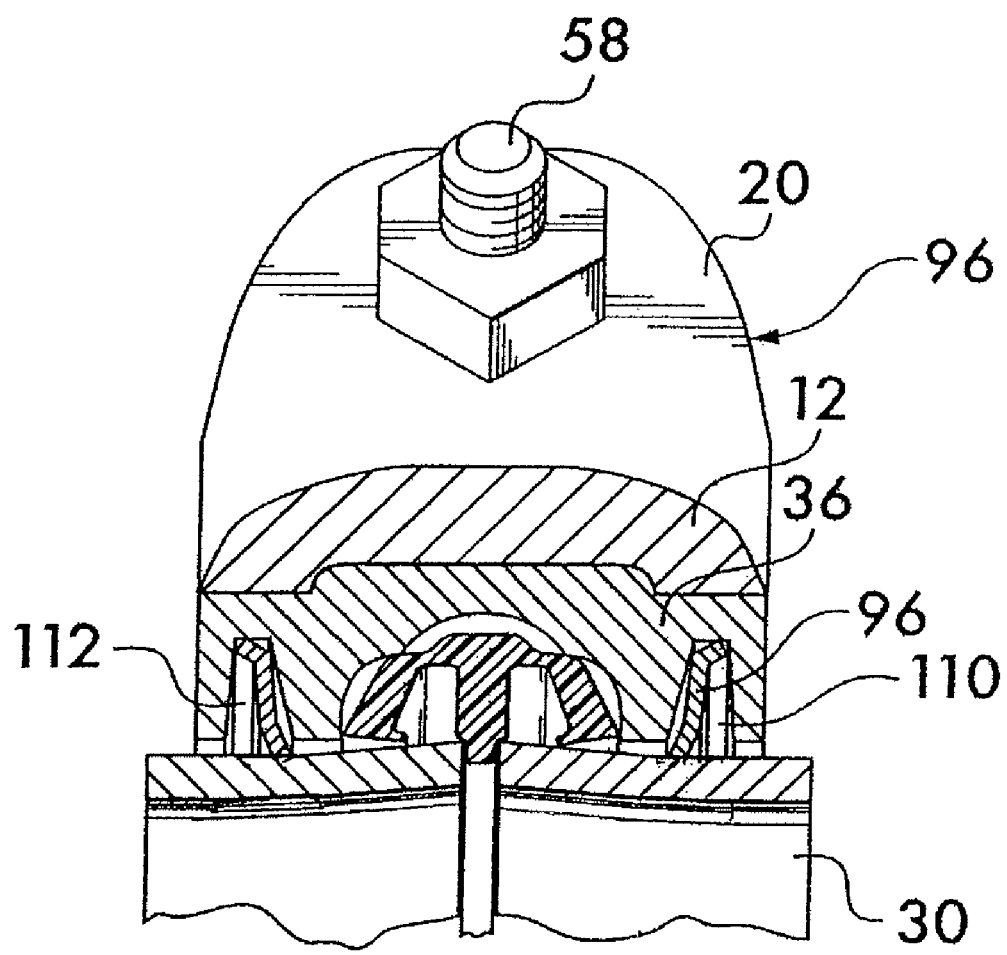
FIG. 17 is a sectional view of a portion of the coupling shown in FIG. 16.

The retainers are received within grooves 106 and 108 in segments 12 and 14 and grooves 110 and 112 in the gripping bodies 36 and 38. Preferably, when assembled, the grooves in the segments align with the grooves in the gripping bodies. As shown with reference to FIGS. 16 and 17, when the pipe elements 30 are inserted into the coupling 94 and the fasteners 58 are tightened, the segments 12 and 14 are drawn together and the gripping bodies 36 and 38 move inwardly in response to the interaction of the reaction surfaces 32 with the contact surfaces 42. The inward motion of the grooves 106, 108, 110 and 112 compresses the bands 100 of retainers 96 and 98 inwardly so that teeth 102 engage the surfaces of pipe elements 30. Because the teeth are angled they deflect inwardly and permit the pipe elements to be inserted into the coupling. But when force is applied which tends to remove the pipe elements from the coupling, the teeth prevent this motion due to the self-jamming characteristics of the angled teeth.

Retainers 96 and 98 preferably have a plurality of tabs 114 which project outwardly from the band 100. As shown in FIG. 16, the tabs engage the grooves 106 and 108 of the segments as well as grooves 110 and 112 of the gripping bodies and provide a degree of radial flexibility to the retainer. This added flexibility permits the segments to be joined in what is known as "pad-to-pad" relation wherein the connection members 18 on the segments abut one another when the fasteners 58 are tightened in spite of dimensional variations in the segments and pipes. It is advantageous that the segments join pad-to-pad as it provides a readily identifiable visual indication that the fasteners are fully tightened and thereby avoids the need for torquing the fasteners to a particular value as proof of completion of a fluid-tight joint. Avoiding the need for torque measurements simplifies installation of the coupling, as a torque wrench is not necessary.

Couplings according to the invention realize an advantage through the use of the moving gripping bodies which allows them to be installed from the pre-assembled state easily using hand tools. The movable gripping bodies reduce the torque required to bring the segments together and grip the pipe elements to effect a fluid-tight joint.

What is claimed is:

1. A method of joining pipe elements in end to end relation, said method comprising:
   using a coupling comprising a plurality of segments connected to one another end to end surrounding a central space, and at least one gripping body positioned between two of said segments, each of said segments having a shoulder positioned in facing relation with a respective end face of said at least one gripping body, each of said segments having projections which extend outwardly from opposite ends thereof;
   inserting each of said pipe elements into said central space;
   moving said segments toward said central space, said segments each having a plurality of arcuate surfaces engageable with said pipe elements, said arcuate surfaces facing said central space;
   engaging each one of said arcuate surfaces with an outer surface of one of said pipe elements;
   moving said at least one gripping body toward said central space, said at least one gripping body having a plurality of gripping surfaces facing said central space;
   engaging each one of said gripping surfaces with an outer surface of one of said pipe elements; and
   contacting said shoulders of said segments with said respective end faces of said at least one gripping body.

2. The method according to claim 1, wherein each of said pipe elements comprises a circumferential groove, said method further comprising engaging each one of said arcuate surfaces within a respective one of said circumferential grooves in said pipe elements.

3. The method according to claim 2, further comprising engaging said gripping surfaces within said circumferential grooves.

4. A method of joining pipe elements in end to end relation, said method comprising:
   using a coupling comprising first and second segments connected to one another end to end surrounding a central space, and first and second gripping bodies positioned between said first and second segments, each of said segments having a shoulder positioned in facing relation with a respective end face of said first and second gripping bodies, each of said first and second segments having projections which extend outwardly from opposite ends thereof;
   inserting each of said pipe elements into said central space;
   moving said first and second segments toward said central space, said first and second segments each having at least two arcuate surfaces engageable with said pipe elements, said arcuate surfaces facing said central space;
   engaging each one of said arcuate surfaces with an outer surface of one of said pipe elements;
   moving said first and second gripping bodies toward said central space, said first and second gripping bodies each having at least two gripping surfaces facing said central space;
   engaging each one of said gripping surfaces with an outer surface of one of said pipe elements; and
   contacting said shoulders of said first and second segments with said end faces of said first and second gripping bodies.

5. The method according to claim 1, further comprising contacting at least one of said projections on one of said segments with at least one of said projections on another of said couplings.

6. The method according to claim 5, further comprising visually inspecting said coupling to ascertain contact between said at least one of said projections on one of said segments with said at least one of said projections on another of said couplings.

7. The method according to claim 4, further comprising contacting said projections on said first segment with said projections on said second segment.

8. The method according to claim 7, further comprising visually inspecting said coupling to ascertain contact between said projections on said first and second segments.

9. The method according to claim 1, further comprising supporting said segments in spaced apart relation to one another on a seal positioned within said central space.

10. The method according to claim 1, further comprising supporting said at least one gripping body on a seal positioned within said central space.

11. The method according to claim 1, further comprising:
    connecting said segments to one another using adjustable fasteners; and
    moving said segments toward said central space by tightening said fasteners.

12. The method according to claim 1, further comprising moving said segments in opposite directions.

13. The method according to claim 1, further comprising visually inspecting said coupling to ascertain contact between said shoulders of said segments with said end faces of said at least one gripping body.

14. The method according to claim 4, further comprising visually inspecting said coupling to ascertain contact between said shoulders of said first and second segments with said end faces of said first and second gripping bodies.

15. The method according to claim 3, further comprising aligning said circumferential groove on each of said pipe elements with a respective one of said arcuate surfaces and a respective one of said gripping surfaces upon said inserting of said pipe elements.

16. The method according to claim 4, wherein sach of said pipe elements comprises a circumferential groove, said method further comprising engaging each one of said arcuate surfaces within a respective one of said circumferential grooves in said pipe elements.

17. The method according to claim 16, further comprising engaging said gripping surfaces within said circumferential grooves.

18. The method according to claim 17, further comprising aligning said circumferential groove on each of said pipe elements with a respective one of said arcuate surfaces and a respective one of said gripping surfaces upon said inserting of said pipe elements.

19. The method according to claim 4, further comprising supporting said first and second segments in spaced apart relation to one another on a seal positioned within said central space.

20. The method according to claim 19, further comprising supporting said first and second gripping bodies in spaced apart relation to one another on said seal.

21. The method according to claim 4, further comprising moving said first and second gripping bodies in opposite directions.

22. The method according to claim 21, further comprising moving said first and second segments in opposite directions.

23. The method according to claim 4, further comprising: connecting said first and second segments to one another using adjustable fasteners; and
moving said first and second segments toward said central space by tightening said fasteners.

* * * * *